US012669136B2

(12) United States Patent   (10) Patent No.:   US 12,669,136 B2

Oono et al.   (45) Date of Patent:   Jun. 30, 2026

(54) FLUID PRESSURE ACTUATOR

(71) Applicant: BRIDGESTONE CORPORATION, Tokyo (JP)

(72) Inventors: Shingo Oono, Tokyo (JP); Shungo Fujita, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/843,285

(22) PCT Filed: Jan. 10, 2023

(86) PCT No.: PCT/JP2023/000326

§ 371 (c)(1),
(2) Date: Sep. 2, 2024

(87) PCT Pub. No.: WO2023/171110

PCT Pub. Date: Sep. 14, 2023

(65) Prior Publication Data

US 2025/0188961 A1   Jun. 12, 2025

(30) Foreign Application Priority Data

Mar. 8, 2022   (JP) ................................. 2022-035715

(51) Int. Cl.
*F15B 15/10*   (2006.01)
*F16L 57/00*   (2006.01)

(52) U.S. Cl.
CPC ............ *F15B 15/103* (2013.01); *F16L 57/00* (2013.01)

(58) Field of Classification Search
CPC ............................... F15B 15/103; F16L 57/00
See application file for complete search history.

(56) References Cited

U.S. PATENT DOCUMENTS

| | | | |
|---|---|---|---|
| 5,083,498 A | 1/1992 | Sato et al. | |
| 5,185,932 A * | 2/1993 | Caines ................... | F15B 15/103 |
| | | | 30/288 |
| 2018/0256434 A1 | 9/2018 | Matsuo et al. | |
| 2020/0256356 A1* | 8/2020 | Nakayama ............. | F15B 15/10 |

FOREIGN PATENT DOCUMENTS

| | | |
|---|---|---|
| JP | S57168891 A | 10/1982 |
| JP | H03113104 A | 5/1991 |
| JP | 2000274410 A | 10/2000 |
| JP | 2004358861 A | 12/2004 |
| JP | 2009250362 A | 10/2009 |
| JP | 3231063 U | 3/2021 |

(Continued)

OTHER PUBLICATIONS

Sep. 10, 2024, International Preliminary Report on Patentability issued in the International Patent Application No. PCT/JP2023/000326.

(Continued)

*Primary Examiner* — Nathaniel E Wiehe
*Assistant Examiner* — Daniel S Collins
(74) *Attorney, Agent, or Firm* — KENJA IP LAW PC

(57) ABSTRACT

Provided is a fluid pressure actuator in which a bamboo shoot part is formed on a free end side of the sealing member to enable engaging and retaining a cover member that is separate from the fluid pressure actuator.

10 Claims, 8 Drawing Sheets

(56)  References Cited

FOREIGN PATENT DOCUMENTS

JP      2021088999  A      6/2021
WO      WO-2018043572  A1  *   3/2018   ............ F15B 15/103

OTHER PUBLICATIONS

May 14, 2025, search result of the Extended European Search
Report issued by the European Patent Office in the corresponding
European Patent Application No. 23766291.1.
Mar. 20, 2023, International Search Report issued in the Interna-
tional Patent Application No. PCT/JP2023/000326.

* cited by examiner

FLUID PRESSURE ACTUATOR

TECHNICAL FIELD

This disclosure relates to a fluid pressure actuator.

BACKGROUND

Fluid pressure actuators that can achieve a desired motion by expanding and contracting a tube covered by a sleeve (also called "McKibben-type fluid pressure actuators") has been proposed for use in the field of robotics (See, e.g., Patent Document 1.). In Patent Document 1, the fluid pressure actuators are used not only as a lifting part (robot arm) to lift objects, but also as a gripping part (finger robot hand) to achieve the behavior of human fingers.

CITATION LIST

Patent Literature

PTL 1: JP 2021-088999 A1

SUMMARY

Technical Problem

However, with the robot hand described above, slippage may occur, when gripping an object, between the object and the tip that contacts the object.

As a solution to this problem, a non-slip cover member could be attached to the sealing member that serves as the tip. However, the cover member may come off or tear from the sealing member due to the weight of the object or repeated use.

Therefore, it is an object of this disclosure to provide a fluid pressure actuator having a structure in which a cover member attached to the sealing member is difficult to come off.

Solution to Problem

The gist structure of the present disclosure is as follows.

A fluid pressure actuator comprising a cylindrical tube that expands and contracts by fluid pressure, a sleeve that is an elastic structure made of woven fiber cords oriented in a predetermined direction and covers an outer circumference of the tube, and a sealing member that seals an end portion in an axial direction of the tube, wherein a bamboo shoot part is formed on a free end side of the sealing member to enable engaging and retaining a cover member that is separate from the fluid pressure actuator.

Advantageous Effect

According to the present disclosure, it is possible to provide a fluid pressure actuator having a structure in which a cover member attached to the sealing member is difficult to come off.

DETAILED DESCRIPTION

Hereinafter, embodiments of the present disclosure will be described in detail with reference to the drawings.

<Fluid Pressure Actuator>

«Overall Schematic Configuration of Fluid Pressure Actuator»

Figure 1:
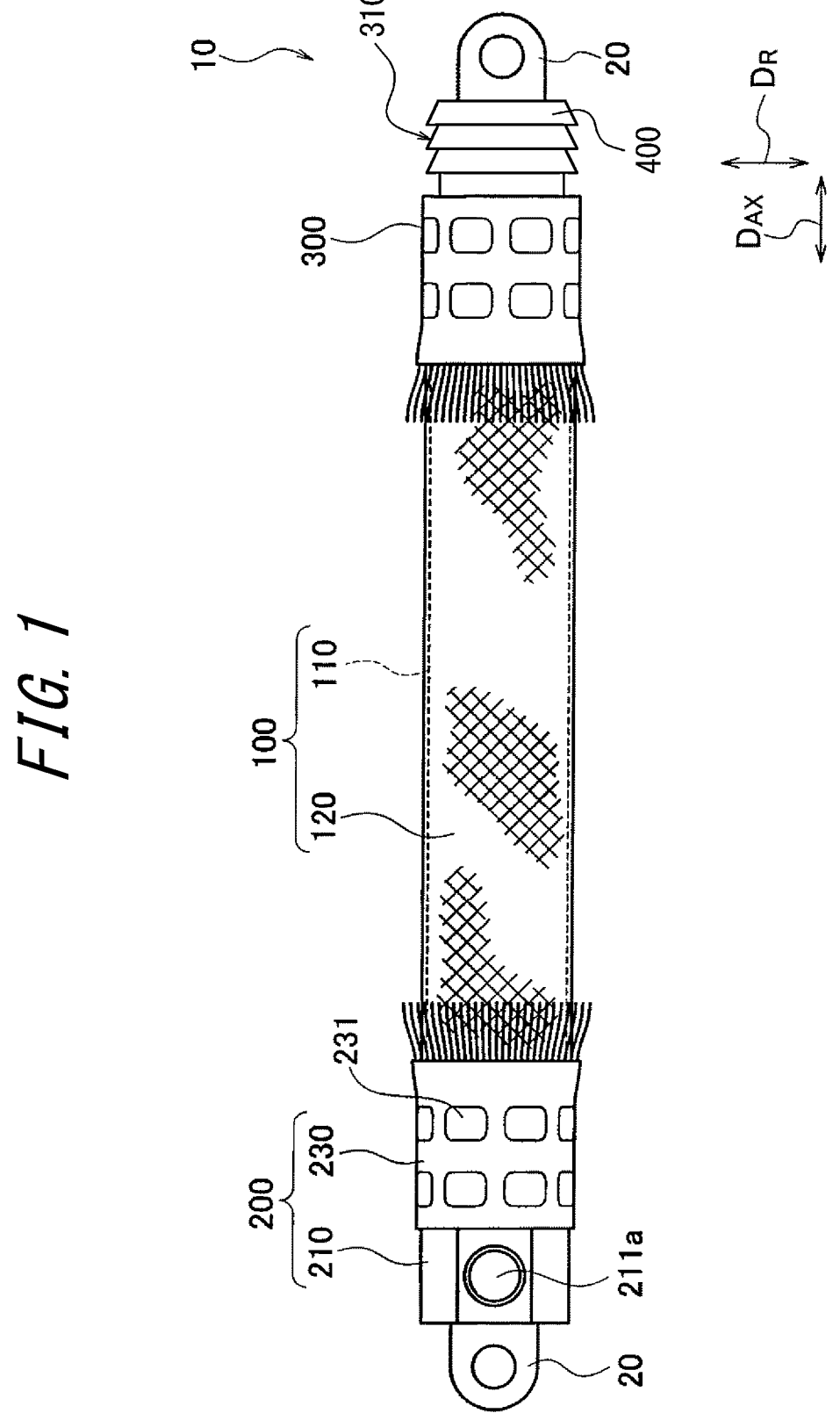
FIG. 1 is a side view of a fluid pressure actuator.

FIG. 1 is a side view of a fluid pressure actuator 10 according to the present disclosure. As illustrated in FIG. 1, the fluid pressure actuator 10 comprises an actuator body 100, a sealing mechanism 200, and a sealing mechanism 300. In addition, a coupling section 20 is provided at each end of the fluid pressure actuator 10.

The actuator body 100 is composed of a tube 110 and a sleeve 120. Fluid flows into the actuator body 100 through a connection port 211_a_.

The basic characteristic of the actuator body 100 is that fluid flow into the tube 110 causes the actuator body 100 to contract in the axial direction DAX and expand in the radial direction DR of the actuator body 100. Also, fluid flow out of the tube 110 causes the actuator body 100 to expand in the axial direction DAX and contract in the radial direction DR of the actuator body 100. This change in the shape of the actuator body 100 allows the fluid pressure actuator 10 to function as an actuator.

Such a fluid pressure actuator 10 is a so-called Mckibben type and can be applied for artificial muscles, as well as for body limbs (such as upper and lower limbs) of robots that require higher capacity (contractile force). To the coupling section 20, members constituting the limbs and the like are connected.

In this embodiment, a Mckibben-type fluid pressure actuator with these basic characteristics is used, and by providing a restraining member 150 (not illustrated in FIG. 1, see FIGS. 2 and 3, etc.) that restrains (regulates or limits; same below) compression in the axial direction DAX, it can be bent (curled) in the orthogonal direction perpendicular to the axial direction DAX, i.e., in the radial direction DR.

The fluid used to drive the fluid pressure actuator 10 can be either a gas, such as air, or a liquid, such as water or mineral oil, however in particular, the fluid pressure actuator 10 can have high durability to withstand hydraulic drive, where high pressure is applied to the actuator body 100.

The sealing mechanism 200 and the sealing mechanism 300 seal both end portions in the axial direction DAX of the actuator body 100. Specifically, the sealing mechanism 200 includes a sealing member 210 and a caulking member 230. The sealing member 210 seals the end portion in the axial direction DAX of the actuator body 100. The caulking member 230 caulks the actuator body 100 together with the sealing member 210. On the outer surface of the caulking member 230, an indentation 231 is formed, which is a mark where the caulking member 230 has been caulked by the jig.

The differences between the sealing mechanism 200 and the sealing mechanism 300 are whether or not the connection port 211a is provided, and whether or not a convex part 400 is provided, as described below. Therefore, except for these points, the structure of the sealing mechanism 300 is similar to that described on behalf of the sealing mechanism 200.

The connection port 211a can be fitted with a hose (conduit) connected to the drive pressure source of the fluid pressure actuator 10, specifically, a gas or liquid compressor. Fluid that flows in through the connection port 211a passes through the passage holes (not illustrated) and flows into the interior of the actuator body 100, specifically, the tube 110.

Figure 2:
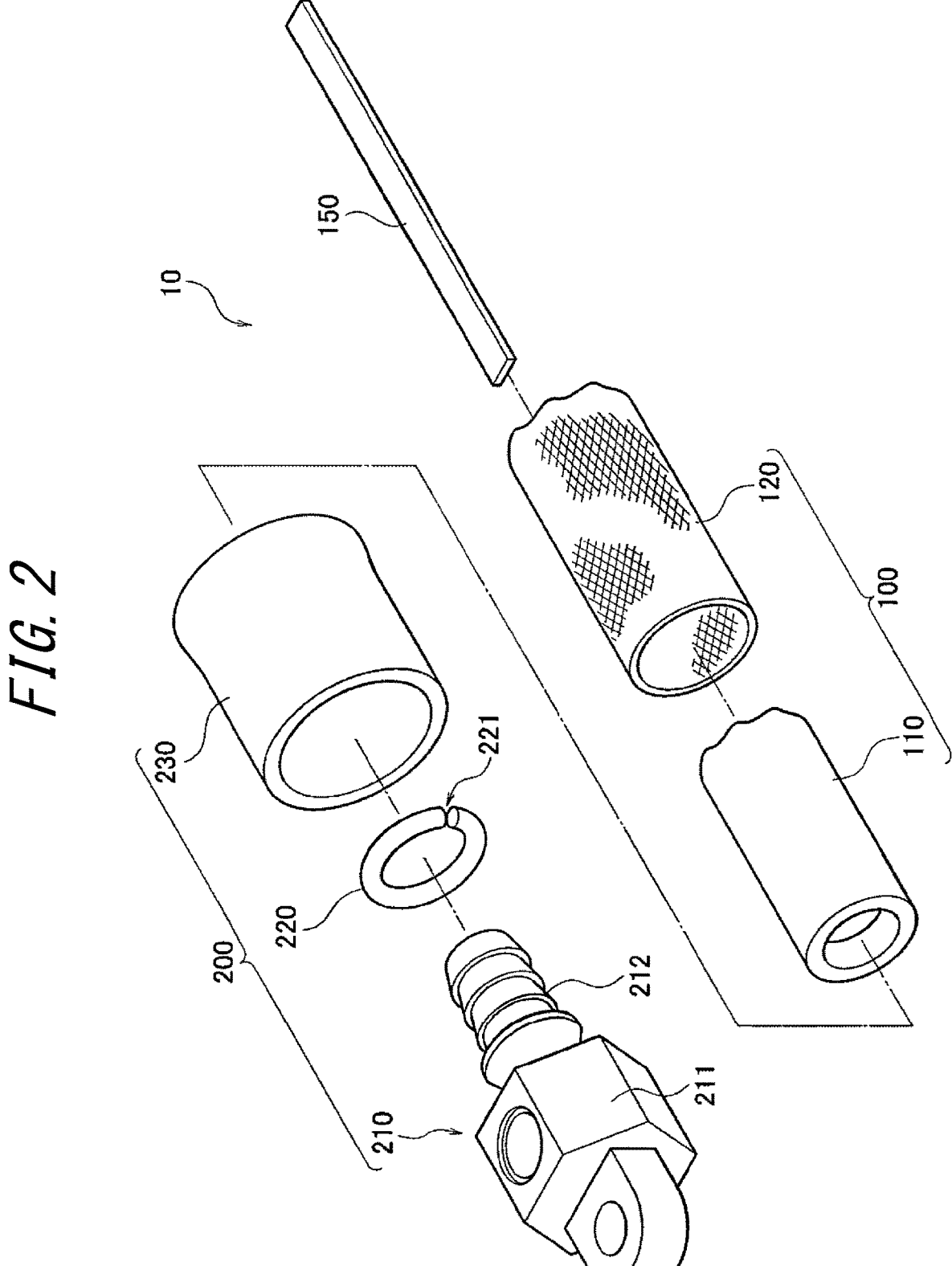
FIG. 2 is a partially exploded perspective view of the fluid pressure actuator.

FIG. 2 is a partially exploded perspective view of the fluid pressure actuator 10. As illustrated in FIG. 2, the fluid pressure actuator 10 comprises the actuator body 100 and the sealing mechanism 200.

The actuator body 100 is composed of the tube 110 and the sleeve 120, as described above.

The tube 110 is a cylindrical tube that expands and contracts with fluid pressure. The tube 110 is composed of elastic material, such as butyl rubber, for repeated contraction and expansion due to the fluid. When the fluid pressure actuator 10 is hydraulically driven, the tube is preferably at least one type selected from the group consisting of NBR (nitrile rubber) with high oil resistance, or hydrogenated NBR, chloroprene rubber, and epichlorohydrin rubber.

The sleeve 120 is cylindrical and covers the outer circumference of the tube 110. The sleeve 120 is an elastic structure made of woven fiber cords oriented in a predetermined direction, and the oriented cords intersect to form a repeated diamond shape. The sleeve 120, by having this shape, pantographically deforms, and follows the tube 110 while regulating its contraction and expansion.

Aromatic polyamide (aramid fiber) or polyethylene terephthalate (PET) fiber cords are preferably used as the cords that make up the sleeve 120. However, it is not limited to these types of fiber cords, but can also be made of high-strength fibers, such as PBO fiber (poly-p-phenylenebenzobisoxazole), for example.

In addition, in this embodiment, the restraining member 150 is provided between the tube 110 and the sleeve 120.

The restraining member 150 does not compress in the axial direction DAX, but is deformable only along the radial direction DR (which may be called the direction of deflection). That is, the restraining member 150 resists compression along the axial direction DAX and is deformable in the orthogonal direction perpendicular to the axial direction DAX (radial direction DR).

In other words, the restraining member 150 has characteristics that make it difficult to deform along the axial direction DAX and flex along the radial direction DR. Note, that the term deformable may be paraphrased as bendable or curlable.

In addition, the restraining member 150 also functions to restrain (regulate) the expansion of the tube 110 (and the sleeve 120) outward in the radial direction DR at the location on the outer circumference of the tube 110 where the restraining member 150 is provided.

In this embodiment, the restraining member 150 is provided on the inner side of the sleeve 120, specifically, in the radially inner space of the sleeve 120, from one end to the other end in the axial direction DAX. In addition, in this embodiment, the restraining member 150 is formed using a leaf spring.

The dimensions of the leaf spring are preferably selected according to the size of the fluid pressure actuator 10 and the required generating force, and are not limited. The material of the leaf spring is also not limited, but typically it is preferably a material that is easy to bend and resistant to compression, such as stainless steel and other metals, etc. For example, the restraining member 150 may be formed from a thin sheet of carbon fiber reinforced plastic (CFRP). Since CFRP is less susceptible to plastic deformation than metal, the fluid pressure actuator 10 easily returns to its original straight state after bending.

The sealing mechanism 200 seals the end portion in the axial direction DAX of the actuator body 100. The sealing mechanism 200 is composed of the sealing member 210, a locking ring 220, and the caulking member 230.

The sealing member 210 is inserted into the tubular actuator body 100. Specifically, the sealing member 210 has a head part 211 and a body part 212, and the body part 212 is inserted into the tube 110.

A metal such as stainless steel can be suitably used as the sealing member 210, but it is not limited to such metals, and a hard plastic material or the like can also be used.

The locking ring 220 secures the sleeve 120 to the sealing member 210. Specifically, the sleeve 120 is folded outward in the radial direction DR through the locking ring 220 (not illustrated in FIG. 2, see FIG. 3).

The locking ring 220 has a partially notched notch 221 to allow engagement with the sealing member 210. The locking ring 220 can be made of the same metal, hard plastic material, or other material as the sealing member 210, as well as natural fibers (natural fiber threads), rubber (e.g., O-rings), or other materials.

The caulking member 230 caulks the actuator body 100 together with the sealing member 210. Specifically, the caulking member 230 is provided on the outer circumference of the portion of the actuator body 100 through which the sealing member 210 is inserted, and caulks the actuator body 100 onto the sealing member 210.

As the caulking member 230, metals such as aluminum alloy, brass, and iron can be used. When the caulking member 230 is caulked by the caulking jig, the indentation 231 is formed in the caulking member 230, as illustrated in FIG. 1.

«Configuration of Sealing Mechanism 200»

Figure 3:
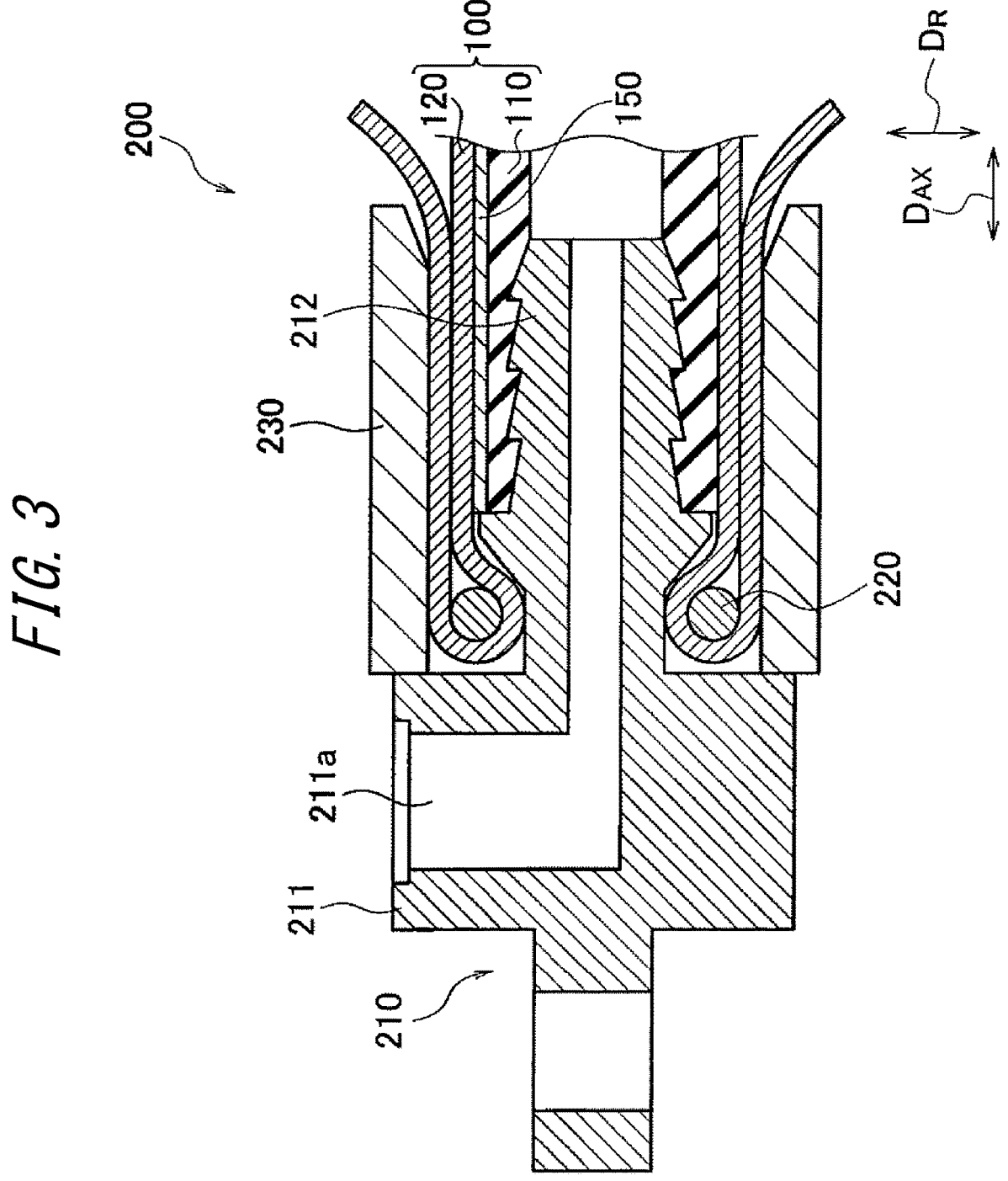
FIG. 3 is a partial cross-sectional view, along the axial direction DAX, of the fluid pressure actuator including a sealing mechanism.

FIG. 3 is a partial cross-sectional view, along the axial direction DAX, of the fluid pressure actuator 10 including the sealing mechanism 200.

As illustrated in FIG. 3, the body part 212 is inserted into the tube 110. The sleeve 120 is folded outward in the radial direction DR through the locking ring 220.

The restraining member 150 is provided on the inner side of the sleeve 120 in the radial direction DR. Specifically, the restraining member 150 is provided between the tube 110 and the sleeve 120.

In addition, the restraining member 150 is provided at a portion in the circumferential direction of the actuator body 100. In other words, the restraining member 150 is provided only at a portion in the circumferential direction of the tube 110 (and the sleeve 120).

The restraining member 150 is provided over the actuator body 100 (i.e., the tube 110 and the sleeve 120) from one end to the other end in the axial direction DAX. Specifically, the restraining member 150 may be provided from the sealing mechanism 200 to the sealing mechanism 300.

However, the restraining member 150 does not necessarily have to completely extend from the sealing mechanism 200 to the sealing mechanism 300, and the restraining member 150 does not have to extend to either the sealing mechanism 200 or the sealing mechanism 300 (especially on the sealing mechanism 300 side, which is more likely to be the free end during bending).

The caulking member 230 is larger than the outer diameter of the body part 212 of the sealing member 210 and is caulked by the jig with the body part 212 inserted. The caulking member 230 caulks the actuator body 100 together with the sealing member 210.

Specifically, the caulking member 230 caulks the tube 110 through which the body part 212 is inserted and the sleeve 120 located on the outer side of the tube 110 in the radial direction DR. In other words, the caulking member 230 caulks the tube 110 and sleeve 120 together with the sealing member 210.

«Configuration of Actuator Body 100»

Figure 4:
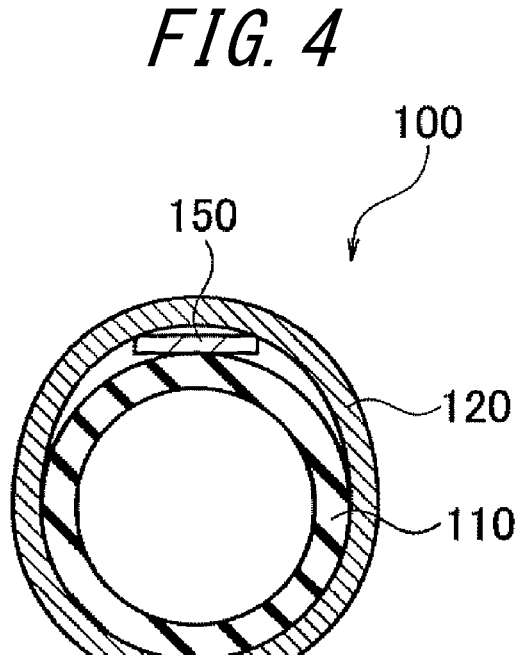
FIG. 4 is a cross-sectional view, along the radial direction DR, of the actuator body.

FIG. 4 is a cross-sectional view, along the radial direction DR, of the actuator body 100. As illustrated in FIG. 4, the restraining member 150 is provided between the tube 110 and the sleeve 120. The restraining member 150 may be in close contact with the tube 110 and the sleeve 120, and some gap may be formed between the restraining member 150 and the tube 110 and/or the sleeve 120 and to the sides of the restraining member 150.

The restraining member 150 is provided at a portion in the circumferential direction of the tube 110. The width of the restraining member 150 is not particularly limited, but based on the outer diameter of the tube 110, it may be approximately half of the outer diameter. As an example, the outer diameter of the tube 110 can be 11 mm, the length of the actuator body 100 that contracts can be 185 mm, and the restraining member 150 (leaf spring) can be 6 mm wide and about 0.5 mm thick.

Note, that in this embodiment, the restraining member 150 is flat, but it may be curved somewhat along the cross-sectional shape of the tube 110 and the sleeve 120 to the extent that it does not affect the way it flexes.

«Behavior of Fluid Pressure Actuator 10»

Figure 5:
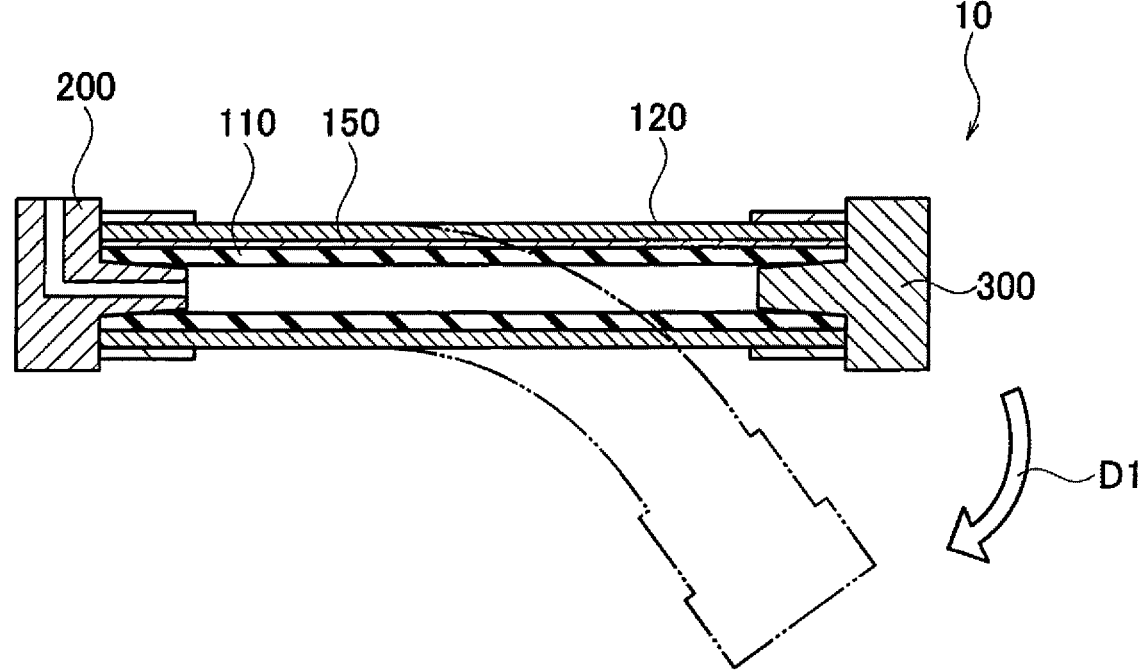
FIG. 5 is an illustration explaining the behavior of the fluid pressure actuator.

FIG. 5 is an illustration explaining the behavior of the fluid pressure actuator. In the fluid pressure actuator 10 illustrated in FIG. 5, the sealing mechanism 200 side is fixed, and the sealing mechanism 300 side is free to move. In other words, the sealing mechanism 200 side is a fixed end, and the sealing mechanism 300 side is a free end.

As described above, when fluid flows into the fluid pressure actuator 10, it tries to contract in the axial direction DAX, but because the restraining member 150 is provided, the contraction along the axial direction DAX is restrained (regulated).

In other words, the restraining member 150 formed by a rigid member such as a leaf spring acts like a backbone, and on the side opposite the position on the outer circumference of the tube 110 and sleeve 120 where the restraining member 150 is provided (the lower side in FIG. 5), as it expands outward in the radial direction DR, the dimensions of the fluid pressure actuator 10 in the axial direction DAX shorten and the fluid pressure actuator 10 (specifically, the actuator body 100) flexes along direction D1. The direction D1 may be called as a flexible direction.

The restraining member 150 is a member provided between the rubber tube 110 and the sleeve 120, resists compression in the axial direction DAX and can deform along a perpendicular direction orthogonal to the axial direction (radial direction DR), and is located at a portion in the circumferential direction of the actuator body 100.

In other words, when the actuator body 100 (Mckibben) tries to contract along the axial direction DAX due to the inflow (pressurization) of fluid into the actuator body 100, the part where the restraining member 150 is located cannot contract because of the high compressive stiffness of the restraining member 150. On the other hand, the other parts of the actuator body 100 try to contract, resulting in a bending direction force along the orthogonal direction (radial direction DR) and bending with the restraining member as its back.

«Example of Robot Hand Configuration Using Fluid Pressure Actuator 10»

Figure 6:
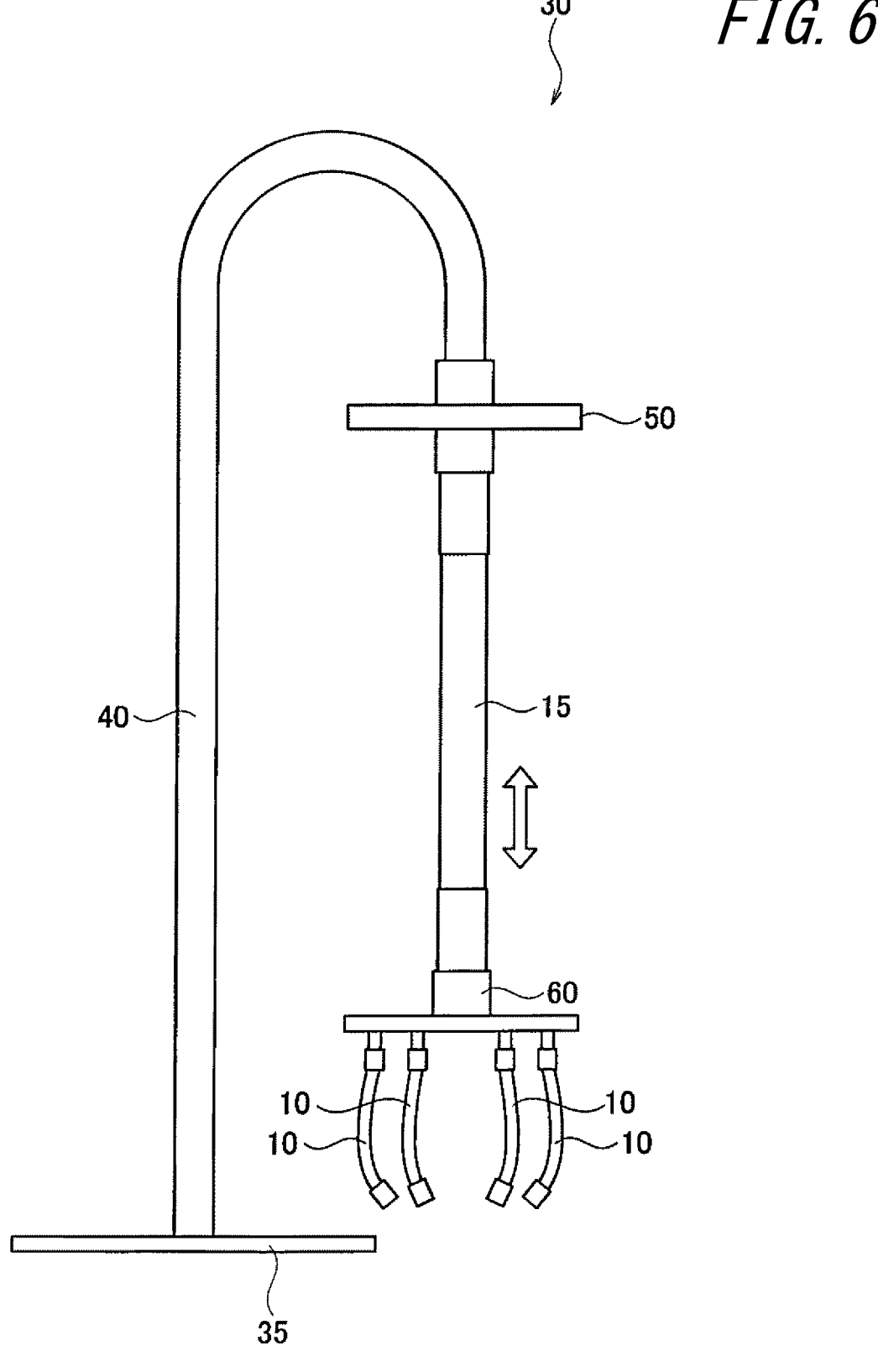
FIG. 6 illustrates an example of a robot hand using a fluid pressure actuator.

FIG. 6 illustrates an example of a robot hand using a fluid pressure actuator. Specifically, FIG. 6 is a schematic side view of a system 30 with a robot hand.

As illustrated in FIG. 6, the robot hand is composed of a plurality of fluid pressure actuators 10. The system 30 comprises a plurality of fluid pressure actuators 10, a pedestal section 35, a strut section 40, an actuator connection section 50, and an actuator connection section 60.

The fluid pressure actuator 10 is a bendable Mckibben-type actuator with the restraining member 150, as described above.

The strut section 40 is erected on the top of the pedestal section 35. The upper end portion of the strut section 40 is folded back toward the bottom, and the actuator connection section 50 is coupled to the tip portion of the strut section 40.

A fluid pressure actuator 15 is suspended from the actuator connection section 50. The fluid pressure actuator 15 is not provided with a restraining member like the fluid pressure actuator 10, but is a general Mckibben-type actuator that contracts and expands along the axial direction (an arrow direction in the figure). In other words, the fluid pressure actuator 15 simply changes its axial length and cannot be bent like the fluid pressure actuator 10. The actuator connection section 60 is coupled to the lower end of the fluid pressure actuator 15. A plurality of fluid pressure actuators 10 are suspended from the actuator connection section 60.

The fluid pressure actuator 15 is larger than the fluid pressure actuator 10 and can generate more force. On the other hand, the plurality of fluid pressure actuators 10, which are suspended from the actuator connection section 60, are bend and can achieve behavior similar to that of human fingers.

The plurality of fluid pressure actuators 10 can grip soft and fragile objects such as chicken eggs without damaging them. In addition, the fluid pressure actuators 10 and the fluid pressure actuator 15 can also grip and lift an object that weighs more than a certain weight, for example, a cannonball (7.26 kg or more) of a cannonball thrower.

The fluid pressure actuator 10 has the following features: large bending angle, large force generation, easy force control (force generated is proportional to pressure), simple structure, and can even directly touch the object to be handled by coating the surface.

In addition, the restraining member 150 provided in the fluid pressure actuator 10 resists compression along the axial direction DAX of the actuator body 100 (specifically, the tube 110) and is deformable in the radial direction DR perpendicular to the axial direction DAX.

Since the restraining member 150 is provided on the inner side of the tube 110, it does not increase the size of the fluid pressure actuator 10. Furthermore, the restraining member 150 can efficiently generate a force in the bending direction.

In other words, the fluid pressure actuator 10 can exert a greater force in the bending direction while avoiding an increase in size.

In this embodiment, the restraining member 150 is provided on a portion in the circumferential direction of the tube 110. This causes some parts to contract and some parts to fail to contract around the circumference of the actuator body 100, and when the fluid pressure actuator 10 is pressurized, it bends in one direction (opposite to the side where the restraining member 150 is provided). This allows for more efficient generation of force in the bending direction and can exert a greater force in the bending direction.

In this embodiment, the restraining member 150 is provided between the tube 110 and the sleeve 120. This effectively restrains (regulates) the expansion of the tube 110 along the axial direction DAX. This allows for more efficient generation of force in the bending direction and can exert a greater force in the bending direction.

Figure 7:
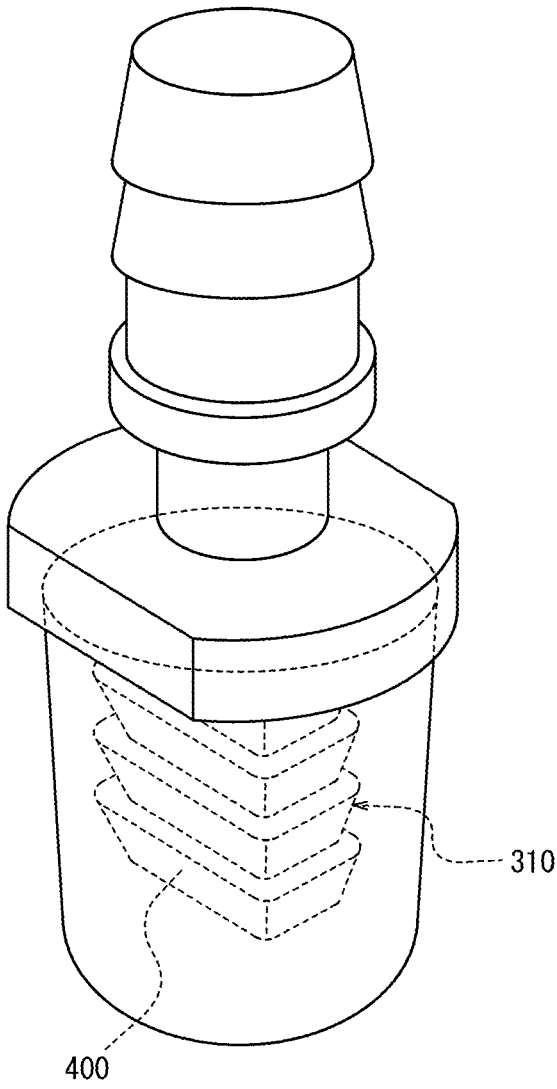
FIG. 7 is a schematic perspective view of a sealing member of a fluid pressure actuator of this embodiment with a cover member attached.
Figure 8:
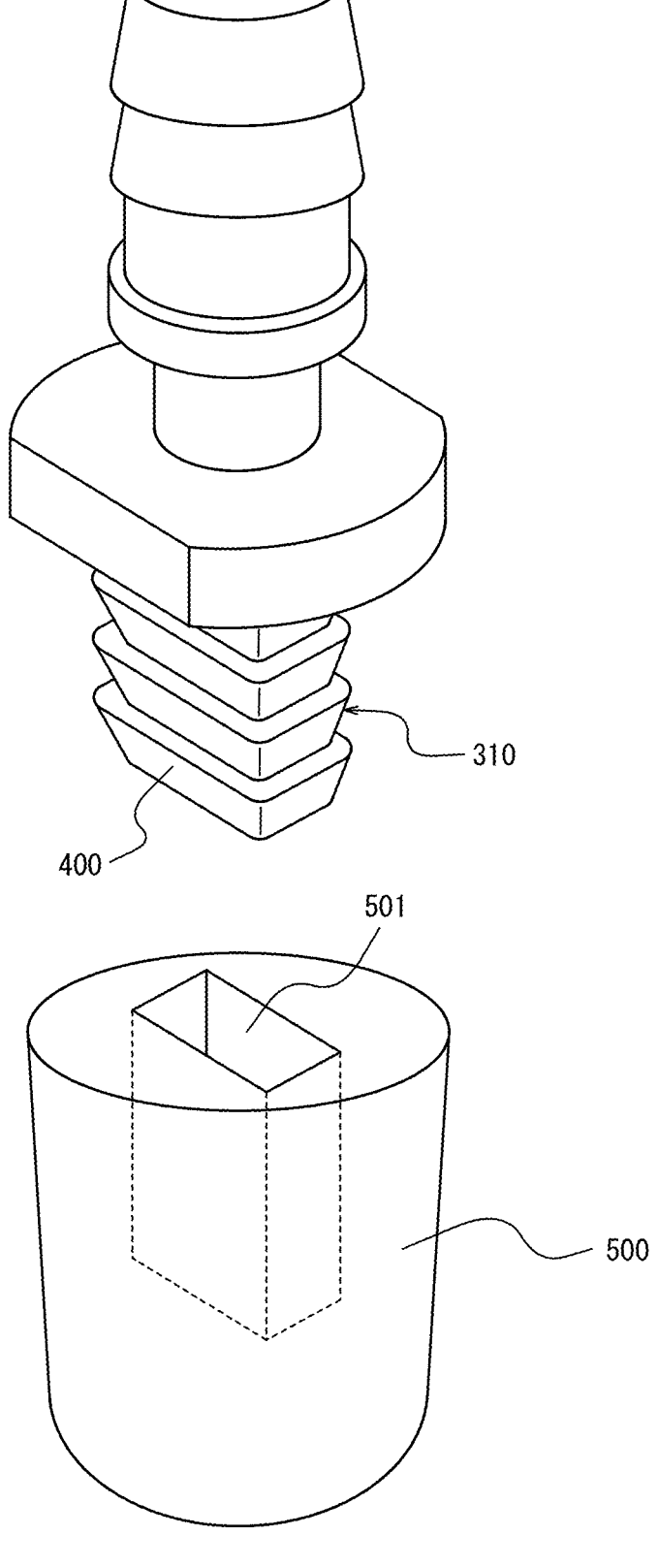
FIG. 8 is a schematic perspective view of the sealing member of the fluid pressure actuator of this embodiment (upper figure) and a schematic perspective view of the cover member attached to the sealing member (lower figure)

FIG. 7 is a schematic perspective view of a sealing member of a fluid pressure actuator of this embodiment with a cover member attached. FIG. 8 is a schematic perspective view of the sealing member of the fluid pressure actuator of this embodiment (upper figure) and a schematic perspective view of the cover member attached to the sealing member (lower figure). As illustrated in FIGS. 1, 7, and 8 (upper figure), in the fluid pressure actuator 10 in this embodiment, a bamboo shoot part 400 is formed on a free end side of the sealing member 310 to enable engaging and retaining a cover member 500 that is separate from the fluid pressure actuator 10. The bamboo shoot part 400, in this example, has a structure in which a plurality of truncated square pyramids, each having an external shape in which a small diameter portion and a large diameter portion are connected by tapered surfaces, are continuous along the axial direction of the fluid pressure actuator 10. In the illustrated example, three truncated square pyramids are arranged continuously in the axial direction, but there can be two or four or more truncated square pyramids. As a result, the sealing member 300 has an annular step formed by the maximum diameter of the large diameter portion of one truncated square pyramid and the minimum diameter of the small diameter portion of the truncated square pyramid adjacent to the one truncated square pyramid. Note, that instead of the truncated square pyramid, it can be made into various other shapes, such as a truncated cone. In the illustrated example, the cover member 500 has an insertion hole 501, which is configured to fit with the bamboo shoot part 400.

The following is an explanation of the effects of this embodiment.

According to the fluid pressure actuator in this embodiment, since the bamboo shoot part 400 is formed on the free end side of the sealing member 310 to enable engaging and retaining the cover member 500 that is separate from the fluid pressure actuator 10, when the cover member 500 (made of rubber, for example) is attached, the cover member 500 can be prevented from coming off the sealing member 310. Thus, according to this fluid pressure actuator, the cover member attached to the sealing member is difficult to dislodge. In addition, since the cover member 500 is less likely to come off the sealing member 310, the thickness of the cover member 500 can be made thicker, thus making the cover member 500 more difficult to tear.

In particular, as illustrated in FIG. 7, the bamboo shoot part has a structure in which a plurality of truncated square pyramids (or truncated cones), each having an external shape in which the small diameter portion and the large diameter portion are connected by tapered surfaces, are continuous along the axial direction of the fluid pressure actuator 10. Therefore, even when a tensile force is applied in the axial direction, the annular-shaped steps (in the illustrated example, three such steps are formed in the axial direction) act as resistance, making it more difficult for the cover member 500 to be removed from the sealing member 310. For example, even when a robot hand grips a heavy object, the cover 500 member can be effectively restrained from coming off the sealing member 310. From this perspective, it is even more preferable that three or more of the above truncated square pyramids (or truncated cones, etc.) be continuous in the axial direction.

In addition, as mentioned above, the sealing member 310 is preferably made of metal. If the sealing member 310 is made of metal, slippage is likely to occur between it and the object, but the cover member 500 (e.g., made of rubber) can also prevent such slippage. Furthermore, such cover member 500 can also be easily replaced, for example, by using a cover member 500 made of different materials depending on the object.

Figure 9:
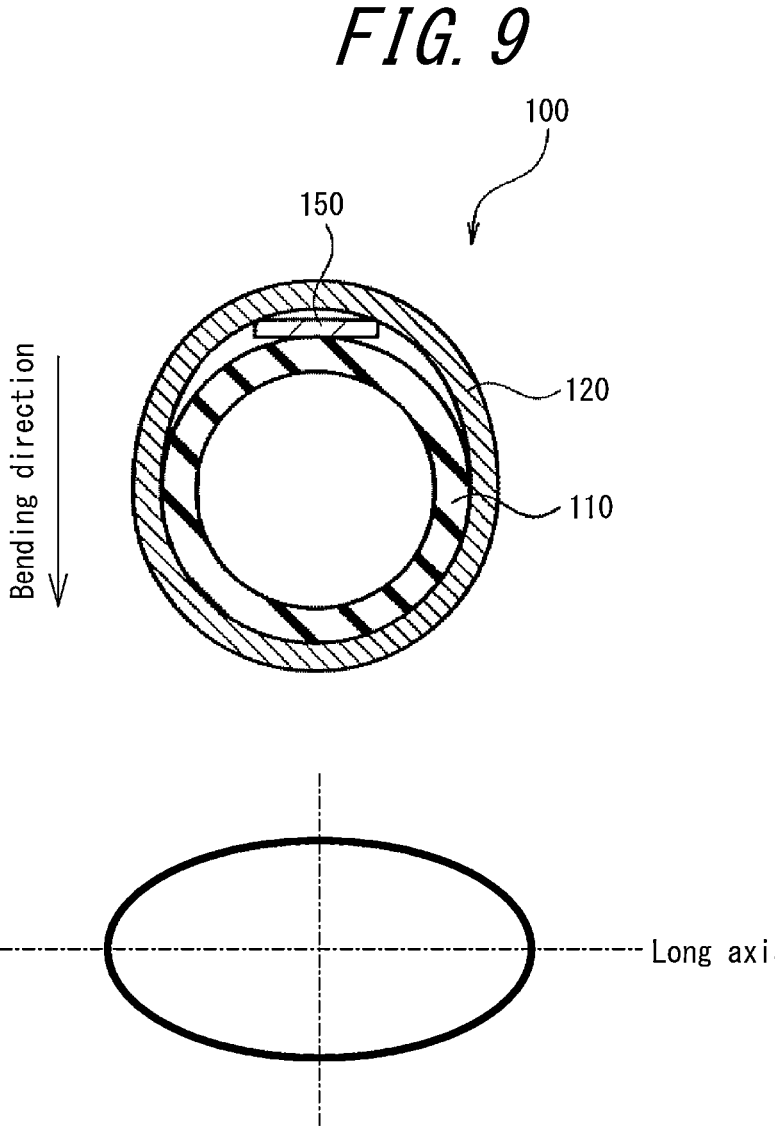
FIG. 9 is an illustration explaining a cross-sectional shape of a bamboo shoot part.
Figure 9:
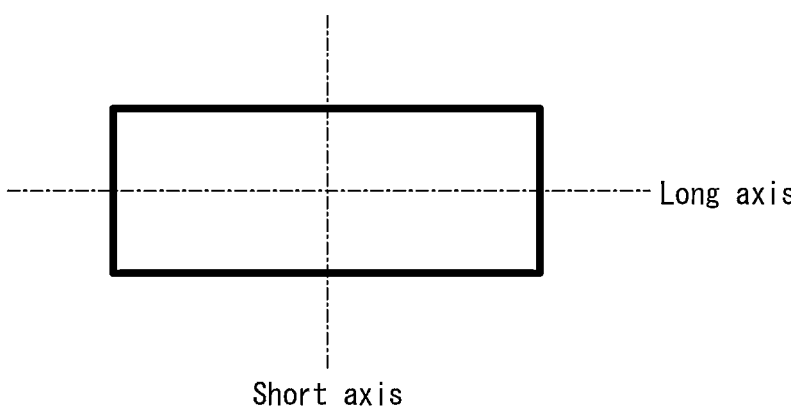

FIG. 9 is an illustration explaining a cross-sectional shape of the bamboo shoot part. As illustrated in FIG. 9, the bamboo shoot part 400 is preferably noncircular in cross section, and more preferably oval or rectangular in cross section. This is because the cover member 500 can be prevented from rotating around the axial direction when the cover member 500 is installed.

In addition, in the robot hand, the bamboo shoot part 400 is preferably positioned in a direction where the long axis in the cross section is perpendicular to the bending direction of the fluid pressure actuator. This is because it ensures a sufficient contact area when gripping an object, enabling more stable gripping.

REFERENCE SIGNS LIST

10, 15 Fluid pressure actuator
20 Coupling section
30 Gripping system
35 Pedestal section
40 Strut section
50, 60 Actuator connection section
100, 100A, 100B Actuator body
110 Tube
120 Sleeve
150, 150A, 150B Restraining member
151 Piano wire
160 Spacer
200, 200A Sealing mechanism
210 Sealing member
211 Head part
211a Connection port
212 Body part
220 Locking ring
221 Notch
230 Caulking member
231 Indentation
300 Sealing mechanism
310 Sealing member
400 Bamboo shoot part
500 Cover member

The invention claimed is:

1. A fluid pressure actuator comprising a cylindrical tube that expands and contracts by fluid pressure, a sleeve that is an elastic structure made of woven fiber cords oriented in a predetermined direction and covers an outer circumference of the tube, and a sealing member that seals an end portion in an axial direction of the tube, wherein a bamboo shoot part is formed on a free end side of the sealing member to enable engaging and retaining a cover member that is separate from the fluid pressure actuator, the bamboo shoot part being a plurality of stages of an engagement structure in which a plurality of truncated square pyramids, each having an external shape in which a small-diameter portion and a large-diameter portion are connected by a tapered surface, are successively formed along the axial direction of the fluid pressure actuator, the cover member having an insertion hole, and the plurality of stages of the engagement structure being configured to engage with the insertion hole so that the cover member is less likely to disengage in the axial direction.

2. The fluid pressure actuator according to claim 1, wherein the bamboo shoot part is noncircular in cross section.

3. The fluid pressure actuator according to claim 2, wherein the bamboo shoot part is rectangular in cross section.

4. The fluid pressure actuator according to claim 2, wherein the bamboo shoot part is arranged in a direction where a long axis in the cross section is perpendicular to a bending direction of the fluid pressure actuator.

5. The fluid pressure actuator according to claim 1, wherein the sealing member is made of metal.

6. The fluid pressure actuator according to claim 3, wherein the bamboo shoot part is arranged in a direction where a long axis in the cross section is perpendicular to a bending direction of the fluid pressure actuator.

7. The fluid pressure actuator according to claim 2, wherein the sealing member is made of metal.

8. The fluid pressure actuator according to claim 3, wherein the sealing member is made of metal.

9. The fluid pressure actuator according to claim 4, wherein the sealing member is made of metal.

10. The fluid pressure actuator according to claim 6, wherein the sealing member is made of metal.

\* \* \* \* \*